April 7, 1964 M. E. WUPPER 3,128,339

ARRANGEMENT FOR FILM MAKING AND PRODUCING A TELEVISION PICTURE SIGNAL

Filed Nov. 1, 1960

Inventor:
Max Eugen Wupper
by Michael S. Striker
Attorney

United States Patent Office 3,128,339

Patented Apr. 7, 1964

3,128,339

ARRANGEMENT FOR FILM MAKING AND PRODUCING A TELEVISION PICTURE SIGNAL

Max Eugen Wupper, Darmstadt, Stephan, Germany, assignor to Fernseh G.m.b.H., Darmstadt, Germany Filed Nov. 1, 1960, Ser. No. 66,590
Claims priority, application Germany Nov. 13, 1959
12 Claims. (Cl. 178—6.8)

When a scene is shot by film cameras and scanned by television cameras simultaneously there are difficulties encountered as those television pickup tubes which are suitable as regards sensitivity, especially those of the image orthicon type, cannot handle the high contrast exhibited by a scene illuminated for film making with flood and spot lighting. Of course, the amount of light which falls on the television pickup tube can be altered, but it is not possible to prevent large white and/or dark spots appearing in the television picture. It is an object of the present invention to overcome these difficulties.

According to a feature of the present invention the scene to be shot by film cameras and scanned by television cameras can be illuminated by flood and spot lighting as usual without getting large white and/or dark spots appearing on the television screen.

It is a further feature of the present invention that in addition to the production of a film for subsequent reproduction a live television programme may be radiated, while the cost of production of both the film and the television programme is reduced. It is also possible to record the video signal thus produced upon magnetic tape.

According to the present invention an arrangement for film making and simultaneously producing a television picture signal is provided comprising floodlight projectors and a spotlight projector, illuminating the scene to be shot in such a way and with such a spectral distribution that the contrast of the film is considerably increased as usual but effecting either no, or no appreciable increase of contrast in the pictures produced by the television pickup device.

It is advantageous to arrange in the optical path between the illuminated scene and the television pickup tube a filter which absorbs practically all the light produced by the spotlight projector and reflected from the scene. It is also convenient to arrange in the optical path between the scene and the spotlight projector used for local illumination of the scene a filter with a characteristic such that the light produced by the spotlight projector affects only the film and is ineffective upon the television pickup device.

In a preferred embodiment of apparatus for carrying out the method according to the invention the television and film cameras are, in known manner, combined into a structural unit and there are arranged in the optical path between the scene to be shot and the film camera optical means, for example a partially transparent reflector or a rotating mirror shutter, which deflect a part of the light to the television camera. In the optical path between these optical means and the photocathode of the television camera tube there is arranged a filter which absorbs substantially the whole of the scene illumination arising from the spotlight projector.

In order that the invention may be more fully understood, various embodiments thereof will now be described with reference to the accompanying drawings, of which like reference characters are used to denote like elements and in which only those elements essential to an understanding of the invention are shown, so as to simplify the illustrations. The drawings comprise FIGURES 1 to 3, of which:

Figure 1:
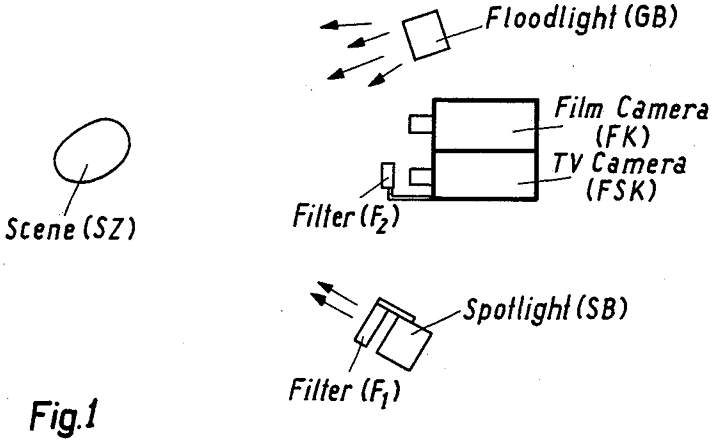
FIGURE 1 is a schematic diagram illustrating the principle underlying the present invention.

In the arrangement shown in FIGURE 1 the scene SZ to be shot is illuminated on the one hand by one or more floodlights, such as GB, which provide the main illumination, and on the other hand by spotlight projectors, of which one only is shown at SB, to provide the necessary accent lighting. It is assumed that this illumination is adequate to shoot the scene by the film camera FK. If a pickup tube of the image-orthicon type is employed in the television pickup camera FSK, then under these conditions of illumination there arises the difficulty that the image-orthicon cannot accept the relatively large contrast of the scene to be scanned.

To overcome this difficulty, in accordance with the present invention, there may be arranged in front of the projector SB for the spotlight illumination a filter $F_1$ with a characteristic such that the spotlight illumination of the scene is ineffective upon the television camera but that the film in the film camera FK receives the necessary spotlight illumination. In order to increase this effect it is in many cases suitable to arrange in front of the lens of the television camera FSK a further filter $F_2$, which absorbs the spotlight illumination from the scene SZ.

Figure 2:
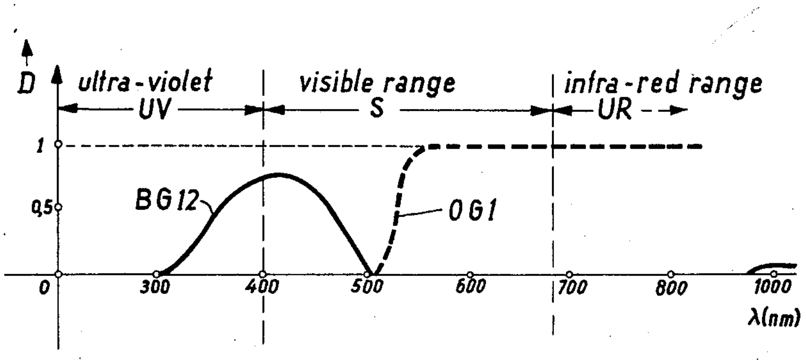
FIGURE 2 is a graph showing the characteristics of filters suitable for use in apparatus according to the present invention.

A filter suitable for use as the filter $F_1$ is a Type OG1 filter (made by Schott & Gen.), of which the spectral transmission characteristic is shown in FIGURE 2. In this figure the abscissa shows the wavelength in nanometers (nm) (1 nm.=1 mμ) while the ordinates show the transmission of the filter. The whole range of wavelengths is shown as being divided into three, the ultraviolet range UV, the visible range S and the infra-red range UR. The filter OG1 placed in front of the spotlight projector SB thus allows yellowish light in the visible range S, above the wavelength of 500 nm. to pass. The scene SZ is illuminated by this light, so that if there is used as the filter $F_2$ a Type BG12 filter (made by Shcott & Gen.) which absorbs all wavelengths above 500 nm., then the highlight illumination of the scene is ineffective on the pickup tube of the television camera. On the other hand the BG12 filter allows sufficient light in the range up to 500 nm. to pass to the pickup tube of the television camera.

Figure 3:
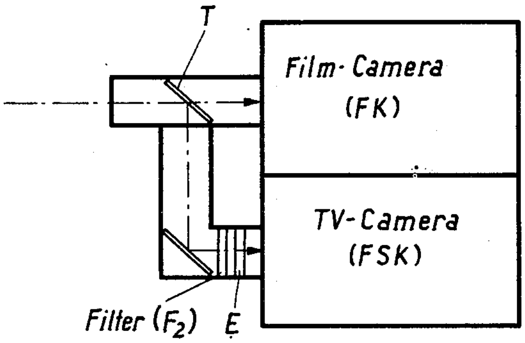
FIGURE 3 shows the structural combination of a film camera and a television camera used according to the present invention.

The film and television cameras can be combined into a single structural unit, as shown in FIGURE 3. In the optical path between the object (not shown) and the film in the film camera FK a mirror-shutter or a partially-transparent mirror or prism T is arranged, which reflects a part of the light to the television camera FSK. In this assembly there is arranged in the optical path between the partially transparent mirror, or the mirror shutter which may replace it, and the pickup tube of the television camera, in addition to the filter $F_2$, another device E for attenuating the light. This device may consist of two plane-parallel, axially-movable transparent plates between which is situated a light-absorbing liquid. By altering the separation of the plates the transmission of this device may be altered at will. It is also possible to colour the liquid between the two plates, so that this liquid filter operates as a colour filter, and in particular absorbs the wavelengths which arise from the spotlight illumination of the scene. It can in many cases be advantageous to employ a light-attenuating device of this kind with a liquid absorbing all wavelengths and a further device with a coloured liquid.

The filter $F_2$ of FIGURES 1 and 3 could possibly be dispensed with if either the photosensitive member of the television pickup tube is insensitive to the spotlight illumination of the scene or if the faceplate of the television pickup tube itself acts as a filter and absorbs these wavelengths. Finally, in front of the photocathode of the television pickup tube a further electrode, for example a decelerating grid, could be arranged, and to the system such potentials could be applied that the highlights of the scene become similarly ineffective. The slow electrons which are liberated by the long-wave components of the spectrum contained in the spotlight illumination are then turned back by the weak decelerating field which results between the decelerating grid and the photocathode and, therefore, cannot take part in the process of forming the charge relief on the storage electrode.

It would also be possible for the spotlight to exhibit a discontinuous spectral distribution, the energy being concentrated in individual discrete wavebands. One such illuminant is sodium light, but it would be more advantageous to employ light in two narrow spectral ranges such that they are together perceived by the eye as white light. There could then be arranged in the optical path between the scene SZ and the television camera FSK a selective reflector formed by interference filters used in the reflective mode, which passes the rays in these discrete wavebands and reflects the rest of the spectrum to the television pickup tube. In the case of illumination with sodium light a multiple filter, e.g. Schott BG20, may be employed.

What is claimed as new and desired to be secured by Letters Patent is:

1. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light of at least one limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said additional light; and means for rendering said additional light of limited spectral range ineffective only on said pickup tube, so that said pickup tube is exposed only to the illumination of said scene by said general light.

2. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light of at least one limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said additional light; and optical filter means arranged in the optical path between said scene and said pickup tube for rendering said additional light of limited spectral range ineffective only on said pickup tube, so that said pickup tube is exposed only to the illumination of said scene by said general light.

3. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light and including light filter means permitting the passage only of a portion of said additional light which includes at least one limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said additional light; and optical filter means arranged in the optical path between said scene and said pickup tube for rendering said additional light of limited spectral range ineffective only on said pickup tube, so that said pickup tube is exposed only to the illumination of said scene by said general light.

4. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light of at least one limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said additional light; and means for rendering said additional light of limited spectral range ineffective only on said pickup tube and comprising two speed plane-parallel transparent plates adjustably movable in axial direction relative to each other and means for adjusting the spacing between said plates, a color liquid contained in the space between said plates and adapted to absorb said additional light of limited spectral range to a degree depending upon the spacing of said plates, so that said pickup tube is exposed only to the illumination of said scene by said general light.

5. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light of at least one limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said additional light; and means for rendering said additional light of limited spectral range ineffective only on said pickup tube and comprising a photocathode in said pickup camera insensitive to said additional light of limited spectral range so that said pickup tube is exposed only to the illumination of said scene by said general light.

6. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light of at least one limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said additional light; and means for rendering said additional light of limited spectral range ineffective only on said pickup tube and comprising photocathode means and electrode means cooperating with said photocathode in said pickup camera for attenuating the effect of said additional light in said photocathode, so that said pickup tube is exposed only to the illumination of said scene by said general light.

7. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light of at least one limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said additional light; and means for rendering said additional light of limited spectral range ineffective on only said pickup tube and comprising photocathode means and accelerating grid means placed in front of said photocathode and cooperating therewith in said pickup camera for attenuating the effect of said additional light in said photocathode, so that said pickup tube is exposed only to the illumination of said scene by said general light.

8. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light and including light filter means permitting the passage only of a portion of said additional light which is determined by high transmission in a selected limited spectral range forming a portion only of said predetermined wide spectral range, said light of limited spectral range being particularly effective on said film and being added to said general light having a predetermined wide spectral range, so that at least said portion of said scene is simultaneously illuminated by said general light and said portion of said additional light; and optical filter means arranged in the optical path between said scene and said pickup tube for rendering said additional light of limited spectral range ineffective on said pickup tube, said optical filter means having a high transmission only in a spectral range distinct from said selected limited spectral range characteristic of said light filter means, so that said pickup tube is exposed only to the illumination of said scene by said general light.

9. In an arrangement for producing a cinematographic picture of a scene and for simultaneously producing a video signal of said scene, in combination, a cinematographic camera directed at the scene and including a film adapted to be exposed to said scene; a television pickup camera directed at said scene and including a pickup tube adapted to be exposed to said scene; means for illuminating the entire scene by general light having a predetermined wide spectral range and a brightness sufficient to produce in said pickup tube a video signal representing said scene and being also effective on said film; means for illuminating additionally at least a portion of said scene which is illuminated by said general light and also represented by said video signal, with additional light of discontinuous spectral distribution, the energy of said additional light being concentrated in separate narrow spectral ranges forming only portions of said predetermined wide spectral range, said light in said separate spectral ranges being particularly effective on said film and being added to said general light having a predetermined wide spectral range, so that at least said portion of said scene is simultaneously illuminated by said general light and said additional light; and means for rendering said additional light of said separate spectral ranges ineffective on said pickup tube and including filter means arranged in the optical path between said scene and said pickup tube for preventing said additional light in said separate spectral ranges from taking effect on said pickup tube, so that said pickup tube is exposed only to the illumination of said scene by said general light.

10. An arrangement as claimed in claim 9, wherein said separate narrow spectral ranges are so selected that two together are perceived as white light.

11. An arrangement as claimed in claim 10, wherein said filter means include two interference filters adapted to be operated in the reflection mode and arranged for passing light in said two narrow spectral ranges in a direction avoiding the photosensitive portion of said pickup tube, while reflecting the remainder of said light having a predetermined wide spectral range towards said photosensitive portion of said pickup tube.

12. A method of simultaneously producing on a film in a cinematographic camera a picture of a scene and producing in the pickup tube in a television pickup camera a video signal of said scene, comprising the steps of: illuminating the entire scene by general light having a predetermined wide spectral range and a brightness sufficient to produce a video signal representing said scene and being also effective on the film of the cinematographic camera; illuminating additionally at least a portion of said scene which is illuminated by said general light and also represented by said video signal, with additional light of at least one limited spectral range forming a portion only of said predetermined wide spectral range, said light of limited spectral range being particularly effective on said film in said cinematographic camera and being added to said general light having a predetermined wide spectral range, so that at least said portion of said scene is simultaneously illuminated by said general light and said additional light; simultaneously exposing said film and said pickup camera to said scene illuminated by said general and by said additional light; and rendering said additional light of limited spectral range ineffective on the pickup tube of said television camera, so that said pickup tube is exposed only to the illumination of said scene by said general light, whereby on said film a picture is produced with contrast corresponding to both the general and the additional light illuminating the scene, and reflected thereby, while a video signal is produced simultaneously with contrast corresponding to the general light illuminating the scene and reflected thereby.

References Cited in the file of this patent

UNITED STATES PATENTS

| | | |
|---|---|---|
| 2,698,356 | Roos | Dec. 28, 1954 |
| 2,753,395 | Lawrence | July 3, 1956 |
| 2,796,799 | Strauss | June 25, 1957 |
| 2,976,358 | Haines | Mar. 21, 1961 |